(12) United States Patent
Klein et al.

(10) Patent No.: US 11,327,171 B2
(45) Date of Patent: *May 10, 2022

(54) CROP CLASSIFICATION AND GROWTH TRACKING WITH SYNTHETIC APERTURE RADAR

(71) Applicant: INTERNATIONAL BUSINESS MACHINES CORPORATION, Armonk, NY (US)

(72) Inventors: Levente Klein, Tuckahoe, NY (US); Siyuan Lu, Yorktown Heights, NY (US); Fernando Jimenez Marianno, Sao Paulo (BR); Nigel Hinds, Great Barrington, MA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 133 days.

This patent is subject to a terminal disclaimer.

(21) Appl. No.: 16/862,739

(22) Filed: Apr. 30, 2020

(65) Prior Publication Data

US 2020/0256978 A1    Aug. 13, 2020

Related U.S. Application Data

(63) Continuation of application No. 15/836,184, filed on Dec. 8, 2017, now Pat. No. 10,705,204.

(51) Int. Cl.
*G01S 13/90* (2006.01)
*G06V 20/10* (2022.01)
*G01S 13/00* (2006.01)

(52) U.S. Cl.
CPC ........ *G01S 13/9005* (2013.01); *G01S 13/904* (2019.05); *G01S 13/9023* (2013.01); *G06V 20/188* (2022.01); *G01S 13/9047* (2019.05); *G01S 13/9054* (2019.05)

(58) Field of Classification Search
CPC .................................................. G06V 20/188
See application file for complete search history.

(56) References Cited

U.S. PATENT DOCUMENTS 5,552,787 A    9/1996 Schuler et al.
5,886,662 A    3/1999 Johnson
(Continued)

OTHER PUBLICATIONS

L. Sagues et al., "Crop Height Monitoring and Surface Parameter Estimating Using Polarimetric and Interferometric Radar Techniques"; Proceedings of the SPIE, vol. 4171, pp. 303-309; published by SPIE, Bellingham, Washington, USA. (Year: 2001).*

(Continued)

*Primary Examiner* — Bernarr E Gregory
(74) *Attorney, Agent, or Firm* — Tutunjian & Bitetto, PC; Randall Bluestone

(57) ABSTRACT

A computer-implemented method executed by one or more satellites for assessing crop development by using synthetic aperture radar (SAR) is presented. The method includes generating SAR images from scanning fields including crops, monitoring grown of the crops within the fields during a predetermined time period, and estimating a height of the crops during the predetermined time period by using interferometric information from one or more of the SAR images and tracking change in height and growth rates. The method further includes differentiating between crops in different fields by monitoring changes in the height of the crops during an entire growing season.

20 Claims, 8 Drawing Sheets

(56) References Cited

U.S. PATENT DOCUMENTS

| | | | |
|---|---|---|---|
| 6,894,637 | B2 | 5/2005 | Moreira et al. |
| 7,924,210 | B2 | 4/2011 | Johnson |
| 8,680,994 | B2 | 3/2014 | Leppanen et al. |
| 10,182,214 | B2* | 1/2019 | Gornik .............. G06T 7/0004 |
| 10,705,204 | B2* | 7/2020 | Klein ............... G06K 9/00657 |
| 2003/0130767 | A1 | 7/2003 | Carroll |
| 2011/0222738 | A1* | 9/2011 | Rikimaru ......... G01S 13/9027 382/110 |
| 2012/0169498 | A1* | 7/2012 | Leppanen ........ G06K 9/00657 340/540 |
| 2014/0163772 | A1* | 6/2014 | Vian .................... G06K 9/46 701/2 |

OTHER PUBLICATIONS

E. Erten et al., "Retrieval of Agricultural Crop Height from Space: A Comparison of SAR Techniques"; published in "Remote Sensing Environment"; vol. 187, pp. 130-144; published online on Oct. 14, 2016. (Year: 2016).*

Julie Betbeder et al.. Assimilation of LAI and Dry Biomass Data From Optical and SAR Images Into an Agro-Meteorological Model to Estimate Soybean Yield, IEEE Journal of Selected Topics in Applied Earth Observations and Remote Sensing, Jun. 2016.

Fu Wenxue et al., Estimation of Leaf Area Index (LAI) Using Polinsar: Preliminary Research, 2011 IEEE International Geoscience and Remote Sensing Symposium, Vancouver, BC, Jul. 2011.

Driss Haboudane et al., Hyperspectral vegetation indices and novel algorithms for predicting green LAI of crop canopies: Modeling and validation in the context of precision agriculture, Remote Sensing of Environment 90, Dec. 2003.

Kun Li et al., Polarimetric decomposition with RADARSAT-2 for rice mapping and monitoring, Can. J. Remote Sensing, Jul. 2012.

List of IBM Patents or Patent Applications Treated as Related dated Apr. 30, 2020, 2 pages.

* cited by examiner

CROP CLASSIFICATION AND GROWTH TRACKING WITH SYNTHETIC APERTURE RADAR

This application is a continuation of U.S. application Ser. No. 15/836,184, filed on Dec. 8, 2017, now U.S. Pat. No. 10,705,204.

BACKGROUND

Technical Field

The present invention relates generally to assessing crop development, and more specifically, to assessing crop development by using synthetic aperture radar (SAR) images.

Description of the Related Art

Synthetic Aperture Radars (SARs) transmit and receive energy at microwave frequencies. A response recorded by these sensors is largely a function of the structure and dielectric properties of a target. The structure of a canopy is different among crops, and changes as crops grow. SARs respond well to these structural differences and thus these sensors are able to accurately identify crop type and have proven sensitive to several crop biophysical parameters. Although optical sensors have traditionally been used for crop monitoring, advances in SAR applications research coupled with availability of SAR data at different frequencies and polarizations has raised the profile of these sensors for agricultural monitoring. The "all weather" capability of SARs makes their use in operational activities of particular interest. Advancements in SAR applications development, continued improved access to data, and a push to transfer SAR research methods to monitoring agencies has led to an increased role of SAR in monitoring agricultural production.

SUMMARY

In accordance with one embodiment, a computer-implemented method executed by one or more satellites for assessing crop development by using a synthetic aperture radar (SAR) is provided. The computer-implemented method includes generating SAR images from scanning fields including crops, monitoring grown of the crops within the fields during a predetermined time period, and estimating a height of the crops during the predetermined time period by using interferometric information from one or more SAR images and tracking change in height and growth rates.

In accordance with another embodiment, a system for assessing crop development by using a synthetic aperture radar (SAR) is provided. The system includes one or more satellites for generating SAR images from scanning fields including well established structures where the location and height of the object is well established, these points being called anchor points. The signal reflected from the anchor points and the signal reflected from crops provide a change that can quantify the height of the crops, a SAR processing system for measuring the absolute height of the crops at the moment the SAR image is acquired and tracking grown of the crops within the fields during a predetermined time period, and crop growth models for estimating a height of the crops during the predetermined time period.

In accordance with another embodiment, a system for assessing crop development by using a synthetic aperture radar (SAR) is provided. The system includes one or more satellites for generating SAR images from scanning fields including crops, a SAR processing system for monitoring grown of the crops within the fields during a predetermined time period, and crop growth models for estimating a height of the crops during the predetermined time period.

In accordance with one embodiment, a system for assessing crop development by using a synthetic aperture radar (SAR) is provided. The system includes one or more moving aerial objects for generating SAR images from scanning a plurality of fields including different crops, a SAR processing system for monitoring grown of the different crops within the plurality of fields during a growing season, and crop growth models for estimating a height of the different crops during the growth season and continuously comparing heights of the different crops during the growing season.

Furthermore, embodiments can take the form of a related computer program product, accessible from a computer-usable or computer-readable medium providing program code for use, by or in connection with a computer or any instruction execution system. For the purpose of this description, a computer-usable or computer-readable medium may be any apparatus that may include means for storing, communicating, propagating or transporting the program for use, by or in a connection with the instruction execution system, apparatus, or device.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The invention will provide details in the following description of preferred embodiments with reference to the following figures wherein.

DETAILED DESCRIPTION

Figure 1:
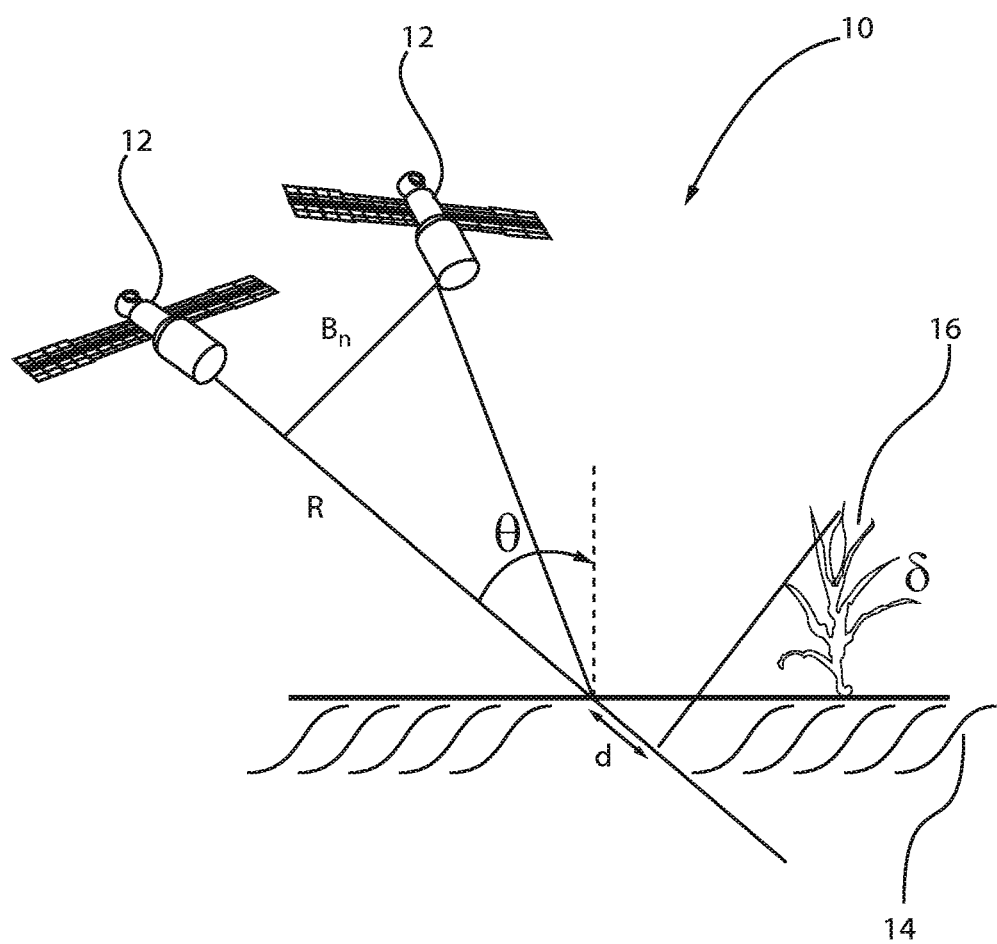
FIG. 1 is a synthetic aperture radar (SAR) image acquisition system for acquiring images of crops, in accordance with an embodiment of the present invention.

Embodiments in accordance with the present invention provide methods and devices for employing geophysical exploration, which encompasses numerous methods for better understanding terrestrial and marine environments. These methods are often applicable to agricultural management. One of the most promising geophysical exploration tools for agriculture includes the use of remote-sensing. The use of remote sensing from air and space borne sensors is desired. For many years aerial photogrammetry has been applied to several components of the agricultural production scheme and its management. Many systems currently use drones at the farm level but drone imaging is limited by the capability of the system to cover large areas and estimates, for example, the crop production across a continental scale. Satellite images, on the other hand, have the ability to cover large areas but are limited by cloud-free images that are required for analysis. However, the ability to use multispectral sensors capturing emitted and reflected light beyond that visible to the naked eye and developing crop models related to crop growth and estimation methods for crop growth will be discussed herein with respect to the exemplary embodiments of the present invention.

Embodiments in accordance with the present invention provide methods and devices for employing a crop classification and crop growth tracking system. The crop classification and crop growth tracking system uses synthetic aperture radar (SAR). SAR can penetrate through clouds and acquire images independent of weather conditions. The reflected radar signal from the ground is dependent on multiple factors, such as soil composition, soil moisture conditions, and vegetation density or general infrastructures like farm buildings, ponds etc. Plants with denser leaves and biomass will have a stronger reflected signal and this can be employed to distinguish between plants that have higher or lower leaf density. Such reflected radar signals, at the beginning of the growing season can be good indicators or areas of lands that were planted, can track when plants are emerging from soil, and can monitor plant growth and track the density of the leaf. Further, radar image acquisition under different viewing angles can be used to interferometrically reconstruct plant heights and track these plant height changes during the entire growing season. Change in plant heights is one way to differentiate between crops, such as corn and soybean. Additionally, the signal reflected by the crops is dependent on the leaf density. Analyzing the texture of the signal (noise associated with reflected radar signal) is another differentiator signal to distinguish between crops.

Embodiments in accordance with the present invention provide methods and devices for implementing SAR to estimate rate of growth for various crops and determine heights of crops during an entire growing season. SAR images include information about an amplitude and a phase of a signal acquired by geo-orbiting satellites. To detect changes in height, phase differences between images acquired at different moments of time are compared. Furthermore, it is relevant to have well-defined anchor points that can provide a fixed signal reflectance that can be referenced to the crop signal. For example, buildings with well-known heights or other large infrastructures that are within the SAR images provide the fixed point with respect to which a change in phase signal can be extracted that can provide a measurement of the height of the crops.

Referencing to a fixed height makes height change measurements between two points less prone to noise. The height of houses, barns, storage tanks, etc. extracted from additional geospatial layers can be used to identify signal from well-known height points. In many cases, resolution of images on the Earth's surface can be in the range of meters. However, the phase signal due to change in height can be significantly smaller. A prerequisite of image acquisition is an accurate knowledge of bare ground topography of that location that constitutes the base ground. The bare ground can be a SAR image acquired when the ground is not covered by vegetation or can be a topographical image acquired using light detection and ranging (LIDAR) where surface structures are extracted and only the bare topography is recovered. Bare ground can also be identified from optical satellite images that show no signature of vegetation across a growing season or reference can be made to, e.g., paved roads.

Embodiments in accordance with the present invention thus provide methods and devices for employing well-known structure heights (e.g., houses, barns, storage tanks, etc.), paved roads, or bare land topographical datasets to detect tiny changes above the surface with a resolution of about less than 10 cm. Such changes can enable crop growth identification specifically to detect crops that have significant height differences, such as corn and soybean. The change in height of these crops is well established and correlates with weather data and growing practices. By taking two measurements of the height of well-defined crops, the growth rate can be established as the difference in height divided by the time lapse between the two-image acquisition. Taking into account a crop growth model, the rate of growth for various crops can be quickly and accurately estimated and compared with the SAR extracted growth rate. From the average height difference between crops, each field can be identified as being planted with a specific crop where areas with similar characteristics can be grouped together to define the extent of a plot that shares similar growth rates and plant height. Furthermore, by analyzing the reflected signal from the land, the noise and spectral distribution of the signal can be a good indicator of the ground features. Combining the signal texture and the growth rate can further improve the delineation of the areas that share similar characteristics. The changes in crop growth can also be an indicator of vegetation state development.

The acquired SAR signal can be used as an independent source of signal or the SAR signal can be combined with optical signals from drones or satellites to further enhance a precision of crop identification and growth rate. It is noted that due to spatial resolution mismatches between different imaging signals, it will be understood that images can be further decomposed based on spectral or texture information to higher granularity to improve crop identification.

It is to be understood that the present invention will be described in terms of a given illustrative architecture; however, other architectures, structures, substrate materials and process features and steps/blocks can be varied within the scope of the present invention. It should be noted that certain features cannot be shown in all figures for the sake of clarity. This is not intended to be interpreted as a limitation of any particular embodiment, or illustration, or scope of the claims.

Crop is defined as an "aggregation of individual plant species grown in a unit area for economic purpose."

Growth is defined as an "irreversible increase in size and volume and is the consequence of differentiation and distribution occurring in the plant."

Simulation is defined as "reproducing the essence of a system without reproducing the system itself." In simulation the essential characteristics of the system are reproduced in a model, which is then studied in an abbreviated time scale.

A model is a schematic representation of the conception of a system or an act of mimicry or a set of equations, which represents the behavior of a system. Also, a model is "a representation of an object, system or idea in some form other than that of the entity itself". The purpose of the model is usually to aid in explaining, understanding or improving performance of a system. A model is, by definition, "a simplified version of a part of reality, not a one to one copy." This simplification makes models useful because it offers a comprehensive description of a problem situation.

Agricultural models are mathematical equations that represent the reactions that occur within the plant and the interactions between the plant and its environment. The model simulates or imitates the behavior of a real crop by predicting the growth of its components, such as leaves, roots, stems, and grains. Thus, a crop growth model not only predicts the final state of total biomass or harvestable yield, but also includes quantitative information about major processes involved in the growth and development of a plant.

Referring now to the drawings in which like numerals represent the same or similar elements and initially to FIG. 1, a synthetic aperture radar (SAR) image acquisition system for acquiring images of crops is presented, in accordance with an embodiment of the present invention.

The SAR image acquisition system 10 includes a plurality of satellites 12 that generate SAR images from scanning crops 16 located on the ground 14. The following equation can be used to generate the SAR images:

$$\Delta\vartheta = -\frac{4\pi}{\lambda}\frac{B_n}{R\sin(\theta)} - \frac{4\pi}{\lambda}\frac{B_n d}{R\tan(\theta)}$$

Where λ is the radar wavelength, d is the change in height relative to a topographic height, B is a distance between satellites, R is a radius of the satellite 12 relative to ground 14, and θ is the azimuth angle.

In this case, accurate knowledge of the topography can improve the height change for a crop. In the SAR imagery, the polarization of the incident radar signal plays a significant role in the conversion of the reflected signal into the association of the signal with vegetative state of the plant. Specifically, the circular polarized signal can provide a better assessment of the signal coming from the vegetation.

In the proposed approach, a Landsat/Sentinel image can be employed to assess that no vegetation is present when a SAR image is acquired. The Landsat program is the longest running enterprise for acquisition of satellite imagery of Earth, running from 1972. The most recent, Landsat 8, was launched on Feb. 11, 2013. The images are a unique resource for global change research and applications in agriculture, cartography, geology, forestry, regional planning, surveillance, and education. Landsat 8 data has eight spectral bands with spatial resolutions ranging from about 15 to about 60 meters and the temporal resolution is about 16 days. The Sentinel is an Earth observation mission developed by the European Space Agency (ESA) as part of the Copernicus Programme to perform terrestrial observations in support of services such as forest monitoring, land cover changes detection, and natural disaster management. It includes a synthetic aperture radar satellite Sentinell-1 and two identical optical satellites, Sentinel-2A and Sentinel-2B.

The spectral information received from the optical satellite can be used to identify the no vegetation areas (or bare land images) and can be used as reference SAR images that can be assumed to be the bare land image. Additionally, a noise-free reflection area in the SAR images is a good indicator of bare ground and can be confirmed using additional geospatial layers like topography or land use data. Thus, the SAR images can be supplemented with at least topography data, optical images, surveys, and farmer assessments to verify and improve estimations of the height of the crops.

A second SAR image is acquired when the crop has emerged in the springtime. A differential phase image is created to assess change in the interferometry signal. The image is corrected for local topographical variation to access the change in vegetation. The change in height for the crop is tracked multiple times after planting (during a predetermined time period). The change is associated with grow rate for a crop that is calculated as the height difference between two consecutive images divided by a time interval between satellite image acquisition.

Figure 2:
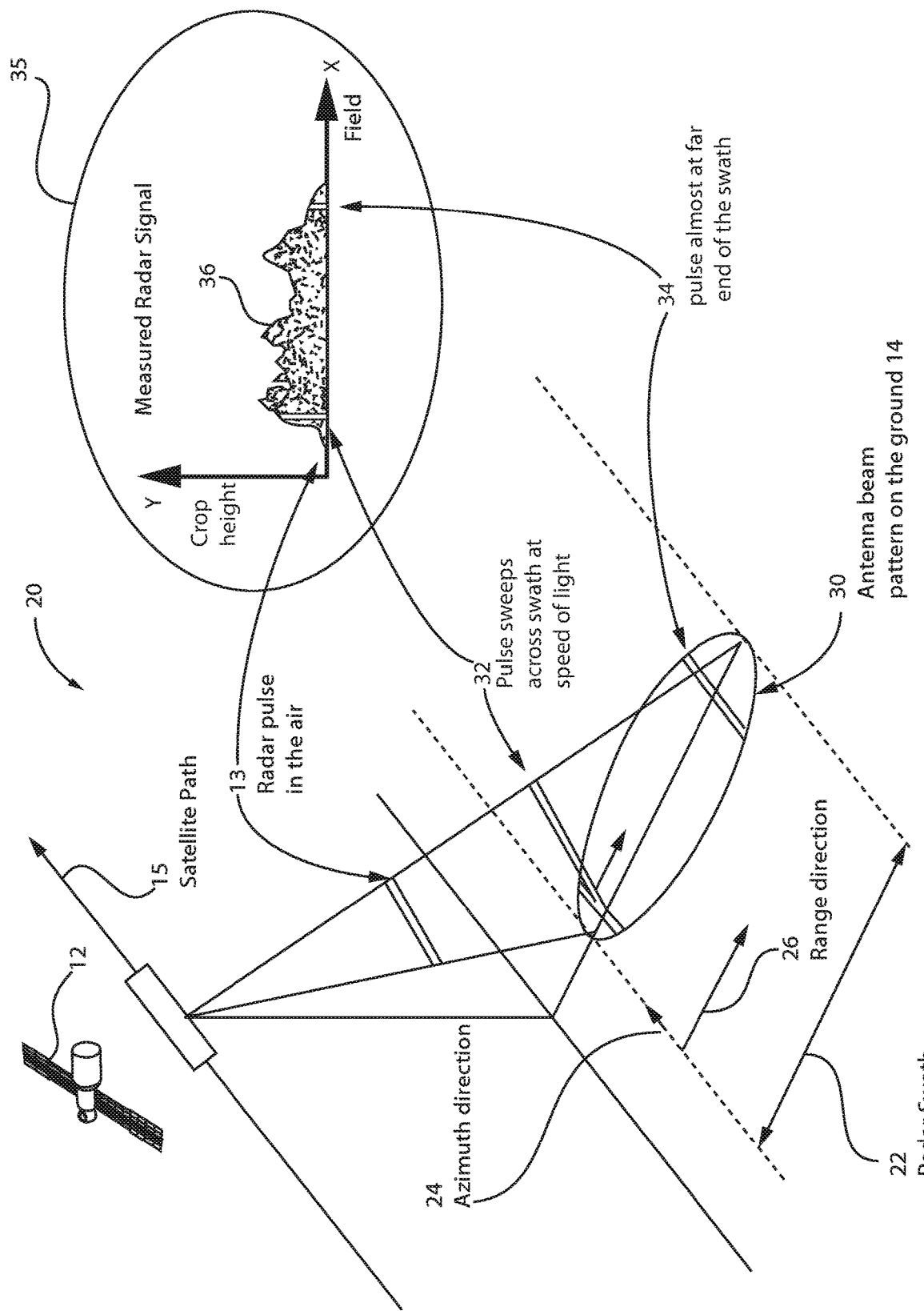
FIG. 2 is a block/flow diagram of an exemplary satellite SAR viewing geometry and spatial resolution system, in accordance with an embodiment of the present invention.

FIG. 2 is a block/flow diagram of an exemplary satellite SAR viewing geometry and spatial resolution system, in accordance with an embodiment of the present invention.

The space-based, strip-map, monostatic SAR system 20 depicts a satellite 12 travelling along a satellite path 15, which is a set of positions at which the SAR transmits a pulse 13. The satellite path 15 is along the azimuth direction 24. Each pulse 13 travels to a target area 30 where the antenna beam intercepts the earth and illuminates targets (e.g., crops) at that location, and the reflected return pulses are in turn collected by the same antenna or satellite 12. The pulse 13 travels along a direction 26 to cover the entire target 30. The area covered or radar swath 22 is further illustrated. A first point 32 of the pulse 13 is shown at a beginning region of the radar swath 22 and a second point 34 of the pulse 13 is shown at an end region of the radar swath 22.

SAR works because the radar pulse 13 travels to and from the target 30 at the speed of light, which is much faster than the speed of the satellite 12. The radar pulse 13 can be translated into a graph 35 depicting the measured radar signal 36. The measured radar signal 36 can designate a height of a crop (e.g., corn) across a field. The height of the crop is designated on the y-axis and the a length of a field is designated on the x-axis.

In a SAR signal processor (FIG. 3), there are specific operations needed to convert a raw data set into an interpretable image 35. The raw SAR data is not an image since point targets are spread out in range and in the azimuth direction 24. As the radar pulse 13 moves along the target 30, the radar-to-target range varies, thus forming the curved trace 35. This translation also produces an along-track frequency or time trace in the azimuth direction 24, induced by Doppler, and range pulse encoding produces a somewhat similar time or frequency trace in range. The SAR image processor (FIG. 3) then compresses this distributed target information in 2D to create the image 35.

To create a SAR image, successive pulses 13 of radio waves are transmitted to "illuminate" the target scene 30, and the echo of each pulse is received and recorded. The pulses 13 are transmitted and the echoes received using a satellite 12, with wavelengths of a meter down to several millimeters. As the SAR device on board the satellite 12 moves, the antenna location relative to the target changes with time. Signal processing of the successive recorded radar echoes allows the combining of the recordings from these multiple satellite positions. This process forms the SAR and allows the creation of higher-resolution images than would otherwise be possible.

The SAR system 20 saves the phase histories of the response at each position as the real beam or pulse 13 moves through the radar swath 22 and then weighs, phase shifts, and sums the pulses 13 to focus on one point target at a time and suppress all others. The SAR system 20 performs the weighing, shifting, and summing to focus on each point target in turn. The SAR system 20 then constructs an image by placing the total energy response obtained in the focusing on a particular target (e.g., crop) at the position in the image corresponding to that target. SAR achieves a very high signal processing gain because of coherent (in-phase) summation of the range-correlated responses in the radar.

SAR is a form of radar that is used to create 2D or 3D images of objects, such as landscapes or crop fields. SAR uses the motion of the radar antenna over a target region to provide finer spatial resolution than conventional beam-scanning radars. SAR is usually mounted on a moving platform, such as an aircraft or spacecraft or satellites, and SAR has its origins in an advanced form of side looking airborne radar (SLAR). The distance the SAR device travels over a target (i.e., crop field) in the time taken for the radar pulses 13 to return to the antenna or satellite 12 creates the large synthetic antenna aperture (the size of the antenna). Typically, the larger the aperture, the higher the image resolution will be, regardless of whether the aperture is physical (a large antenna) or synthetic (a moving antenna). This allows SAR to create high-resolution images with comparatively small physical antennas.

The 3D processing is performed in two steps: the azimuth direction 24 and range direction 26 are focused for the generation of 2D (azimuth-range) high-resolution images, after which a digital elevation model (DEM) is used to measure the phase differences between complex images, which is determined from different look angles to recover the height information. This height information, along with the azimuth-range coordinates provided by 2D SAR focusing, gives the third dimension, which is the elevation direction. The first step needs only standard processing algorithms and for the second step, an additional pre-processing stage such as image co-registration and phase calibration is used. In addition to this, multiple baselines can be used to extend 3D imaging to the time dimension. 4D and multi-D SAR imaging allows imaging of complex scenarios, such as fields including crops, and has improved performances with respect to classical interferometric techniques such as persistent scatterers interferometry (PSI).

Figure 3:
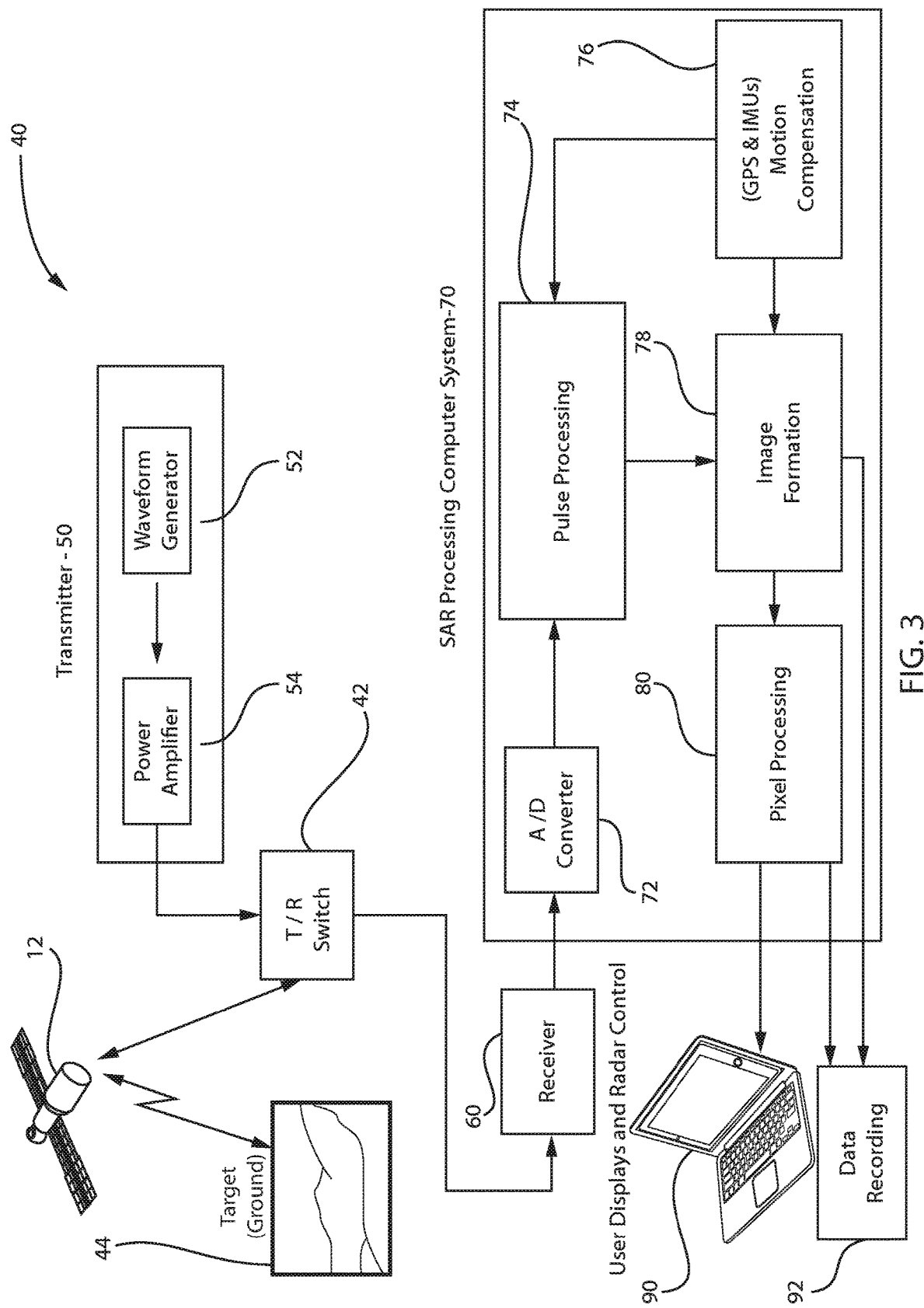
FIG. 3 is a block/flow diagram of an exemplary SAR system depicting a receiver, transceiver, and processing system, in accordance with an embodiment of the present invention.

FIG. 3 is a block/flow diagram of an exemplary SAR system depicting a receiver, transceiver, and processing system, in accordance with an embodiment of the present invention.

As noted above, SAR is an imaging radar mounted on a moving platform. Electromagnetic waves are sequentially transmitted, and reflected echoes are collected, digitized, and stored by the radar antenna for later processing. As transmission and reception occur at different times, they map to different positions. The well-ordered combination of the received signals builds a virtual aperture that is much longer than the physical antenna length. This is why it is named "synthetic aperture," giving it the property of being an imaging radar. The range direction is parallel to flight track and perpendicular to azimuth direction, which is also known as along-track direction because it is in line with the position of the object within the antenna's field of view.

In various exemplary embodiments, the SAR system 40 includes a transmitter 50, a receiver 60, and a SAR processing computer system 70.

The transmitter 50 includes a waveform generator 52 and a power amplifier 54. The transmitter 50 communicates with the receiver 60 via a transmitter/receiver switch or T/R switch 42. The T/R switch 42 receives SAR images from satellite 12 which generates the data from scanning a target 44 (e.g., field of crops).

The receiver 60 sends the SAR data to the SAR processing computer system 70. The SAR processing computer system 70 includes an A/D converter 72, a pulse processing block 74, a motion compensation block 76, an image formation block 78, and a pixel processing block 80. The processed data is then sent to computer processing units 90 and data recording units 92. The computer processing units 90 can be computers, lap tops, smart phones, tablets, a personal digital assistant, a wearable device, an Internet appliance, a communications device, wired or wireless device, or any other electronic device having at least one processor for processing the SAR images. The recording units 92 can be any type of memory.

Figure 4:
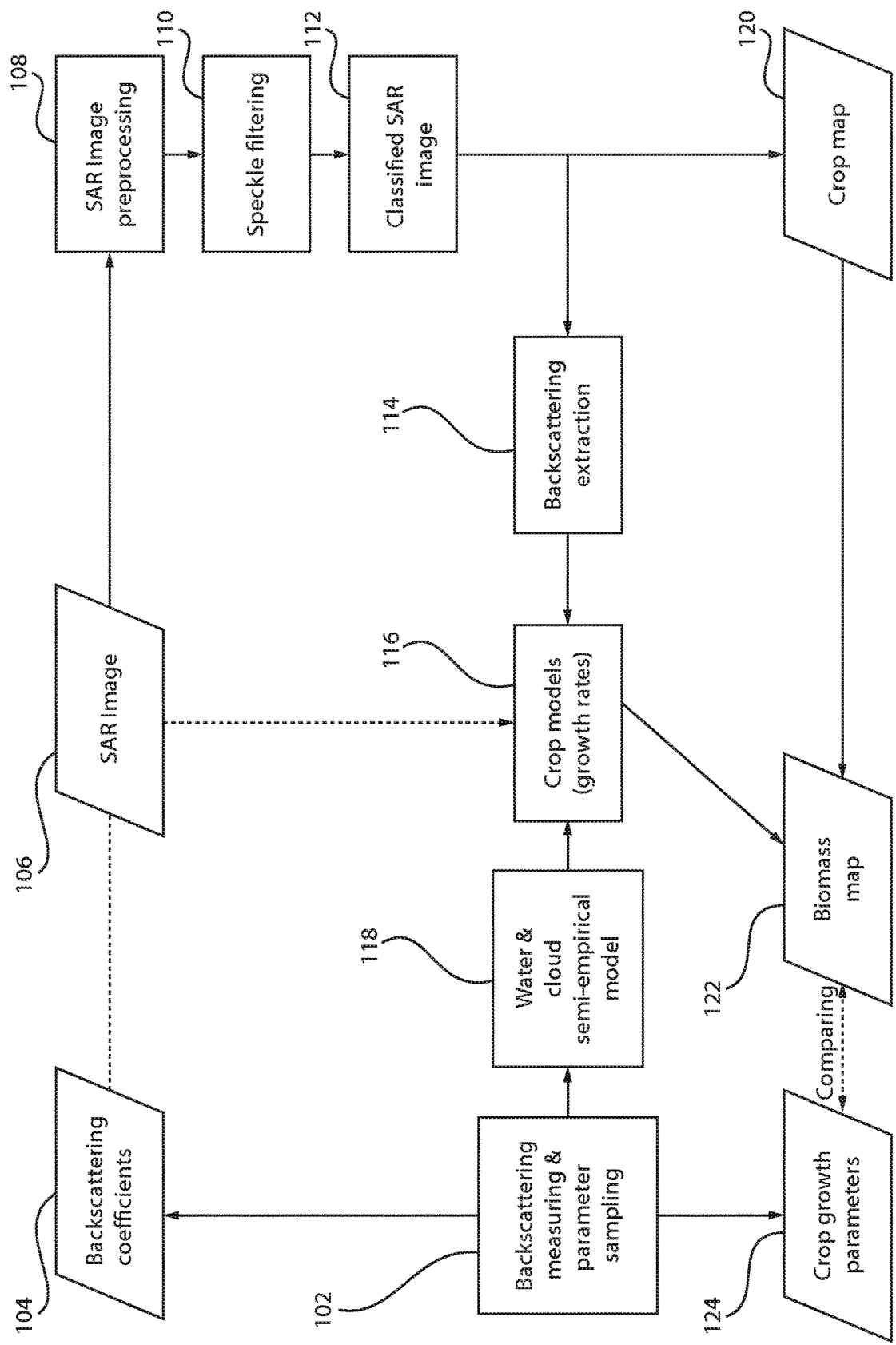
FIG. 4 is a block/flow diagram of an exemplary SAR crop image processing system, in accordance with an embodiment of the present invention.

Thus, a SAR includes an end-to-end system that has radar building blocks such as an antenna or satellite 12, a transmitter 50, a receiver 60, and a high technology data processing system 70. The radar maintains stringent control of signal characteristics and collects coherent phase information to allow for the construction of the image. If phase-preserving disciplines are rigidly enforced, a SAR can produce an image whose along-track spatial resolution is largely independent of wavelength and target range. As a result, there must be a translation of either the target through the real radar beam, or the real beam through the target, or a combination of both processes that produce the necessary systematic change of phase in the target's signal during the observation time of the radar FIG. 4 is a block/flow diagram of an exemplary SAR crop image processing system, in accordance with an embodiment of the present invention.

In various exemplary embodiments, the SAR crop image processing system includes a backscattering measuring and parameter sampling block 102 that communicates backscattering coefficients 104 and SAR images 106 to a SAR image processing block 108. The SAR data then goes through a speckle filtering block 110. The filtered SAR data is then classified into a plurality of different classes by a classified SAR image block 112.

Regarding the speckle filtering block 110, it is noted that SAR transmits a precise signal toward its target (e.g., crop field) and, when the reflected radiation returns, a SAR records not only the amplitude of that signal, but its phase as well. It is the phase information which allows for the post-facto coherent summation of thousands of recorded signals in the correlator during the aperture synthesis operation. Coherent signals have properties that are considerably different from their non-coherent counterparts. The coherent interference between targets included within a resolution cell is the basis for much of the scintillation of coherent radar imagery, an effect referred to as speckle. Thus, there is a wide variation in the SAR image, even when given a uniform input. This variation can be considered as form of noise. This speckle can be filtered by the speckle filtering block 110.

Moreover, the classified SAR images can be combined with crop map data and biomass data via the crop map block 120 and the biomass map 122. The classified SAR images go through backscattering extraction block 114 and are provided to a crop models block 116. The crop models block 116 includes creating, training, and updating crop models for determining at least crop growth rates of a plurality of different plants in a plurality of different fields. The crop models block 116 can also receive and process water and cloud semi-empirical data models 118. The backscattering measuring and parameter sampling block 102 further generates crop growth parameters via a crop growth parameter block 124 and combines the data with the biomass map 122.

Therefore, FIG. 4 illustrates one process for forming crop models 116 that can at least estimate crop growth rates across a plurality of fields. A Crop Simulation Model (CSM) 116 is a simulation model that helps estimate crop yield or crop heights or crop growth as a function of weather conditions, soil conditions, and/or choice of crop management practices. Crop simulation models 116 can been classified into three broad categories.

(1) Statistical models: These typically rely on yield information for large areas (across a county) and identify broad trends. The two main trends identified are a secular trend of a gradual increase in crop yield and variation based on weather conditions.

(2) Mechanistic models: These attempt to use fundamental mechanisms of plant and soil processes to simulate specific outcomes. These involve fairly detailed and computation-intensive simulations.

(3) Functional models: These use simplified closed functional forms to simulate complex processes. They are computationally easier than mechanistic models, and can often give results that are of somewhat lesser accuracy.

Crop simulation models 116 use quantitative descriptions of eco-physiological processes to predict plant growth and development as influenced by environmental conditions and crop management, which are specified for the model as input data. Crop modeling 116 can be been used primarily as a decision-making tool for crop management.

Of the two different, but not exclusive, approaches to crop modeling, one focuses on dissected parts of plants, like leaf canopy or root structure. The other approach integrates models for different physiological traits to simulate the growth of the whole plant. Whole-crop computer simulation models use plant physiology and environmental variables to calculate plant growth, or more specifically, yield and dry matter production. Both directions are increasingly coupled with molecular genetics to facilitate crop modeling.

Physiology-based crop simulation models have become a key tool in extrapolating the impact of climate change from limited experimental evidence to broader climatic zones, soil types, crop management regimens, crops and climate change scenarios. While these models are a simplification of the reality, they allow a first assessment of the complexity of climate change impact in agriculture. The crop models 116 play an increasingly important role in assisting agriculture to adapt to climate change. This includes the use of modeling to optimize management practices, assist in breeding programs, develop new crop rotations, and maximize the value of seasonal climate forecasts. In order to meet the increasing demand for assessment of climate change impact, crop models need to be further improved and tested with climate change scenarios involving various changes in ambient temperature and carbon dioxide ($CO_2$) concentration. It is contemplated that the crop models 116 of the present invention can be any type of crop model incorporating any type of variables or parameters. Thus, these crop simulation models 116 can be employed to determine the short-term impact of weather on growth and development as well as the long-term impact of climate and associated environmental risks on crop yield or crop growth.

Figure 5:
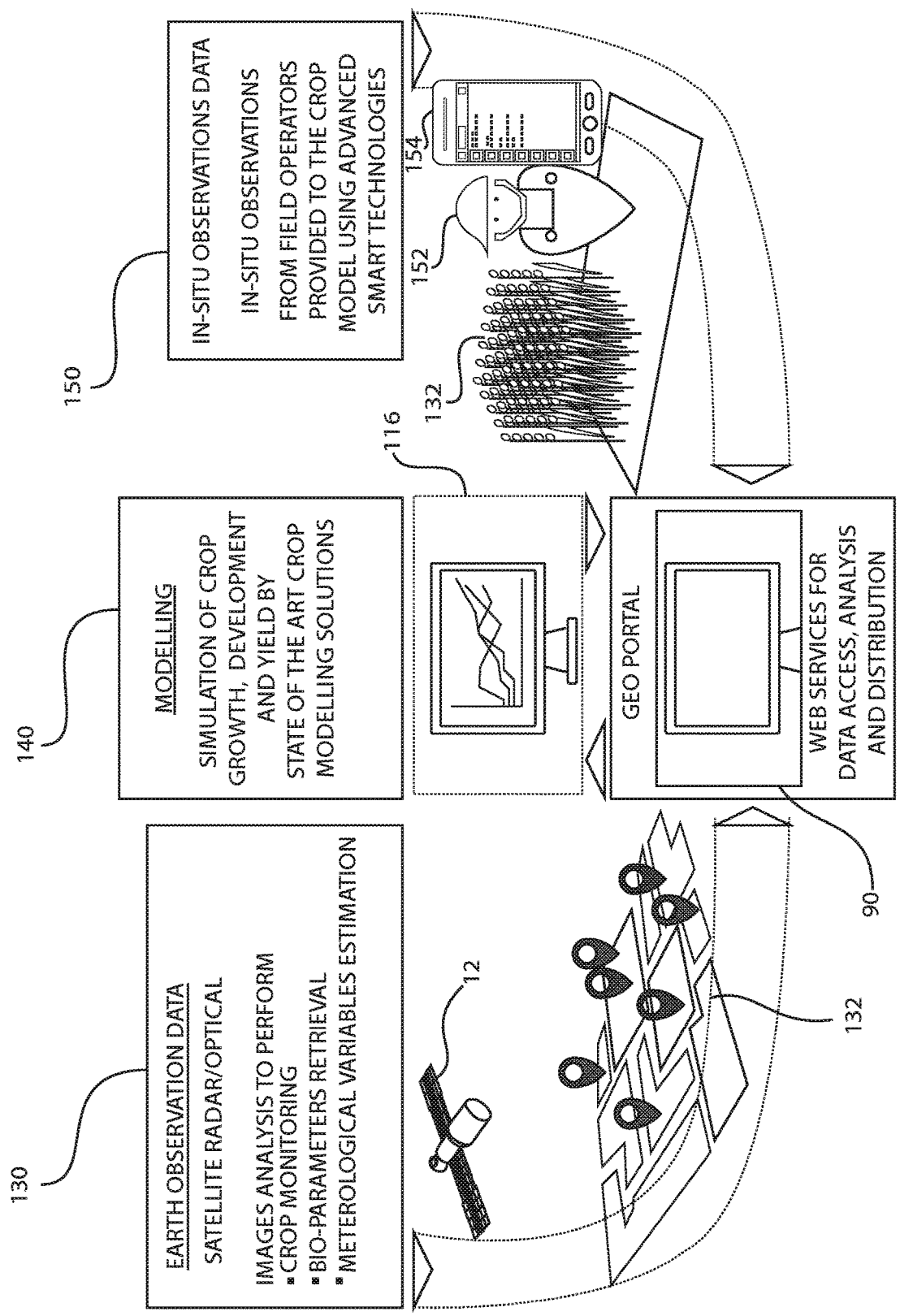
FIG. 5 is a block/flow diagram of an exemplary system for integrating crop models, maps derived from SAR, earth observations data processing, and in-situ observation data to a geo portal capable of being accessed by end-users, in accordance with an embodiment of the present invention.

FIG. 5 is a block/flow diagram of exemplary system for integrating crop models, maps derived from SAR, earth observations data processing, and in-situ observation data to a portal capable of being accessed by end-users, in accordance with an embodiment of the present invention.

In various exemplary embodiments, the earth observation data 130 and the in-situ observations data 150 can be provided to a geo portal 90 including web services for SAR data access, analysis, and distribution. The geo portal 90 communicates with the crop growth modeling 140 derived from the crop models 116 to derive data based on the fields of crops 132. The in-situ observation data 150 can be provided, in one example, by farmers 152 monitoring their crops via a mobile device 154.

Regarding crop modeling 140, crop models are computer models, which are mathematical representations of a real world system. The main goals of the crop models 116 is to estimate agricultural production as a function of weather, soil conditions, and crop management. Crop models 116 can use one or more sets of differential equations, and calculate both rate and state variables over time, normally from planting until harvest maturity or final harvest. In addition to the types of models already described, some further models can include:

Dynamic Crop Simulation Models: These models predict the changes in crop status with time as a function of exogenous parameters. For example, models that predict the changing number of bolls on a cotton plant throughout the growing season, or the changing soil water content or temperature at a certain depth throughout the season, are dynamic simulation models.

Phenological Models: Are the broad classes of models that predict the crop development from one growth stage to another. These predictions are generally based upon the accumulated heat units, with development being delayed by various stresses.

Stochastic Models: Are those that are based upon the probability of occurrence of some events or exogenous variables. They can have mechanistic sub models or subroutines. Weather variables are often treated in a stochastic manner or probability of occurrence and as such can be combined with a mechanistic crop model. The same might also be done with insects, diseases, and weeds.

Physically and Physiologically Based Simulation Models: Are those mechanistic models whose plant or soil processes can be physiologically, physically or chemically described. For example, nitrogen can be taken up from the soil by root systems based upon the soil nitrogen content and the rate of solution flow to the root. Thus the physical placement of the fertilizer with regard to the plant root system is important, as well as soil and plant nitrogen transformation.

Moreover, data is needed to run the crop simulation model 116. All crop simulation models 116 receive as input, data on the management of the crop 132, as well as the macro and micro environmental factors associated with the weather and the soil. Management data includes a latitude of a site, row spacing, plant population, amount and timing of fertilizer applications, and similar information. In particular, meteorological data can include max time (Tmax) and min time (Tmin), total solar radiation, precipitation, humidity, and wind speed. Soil data can include depths of the major soil horizons, for each horizon, the particle size analysis, bulk density (BD), water release curve and saturated hydrocarbons (HC), residual fertilizer content at the start of the season, organic matter content at planting, and soil temperature. Additional data can include crop management data and crop coefficients.

Therefore, SAR provides for all-weather, day or night imaging capabilities and frequent revisits, thus being a dominant high-resolution remote sensing data source for agriculture monitoring in tropical and subtropical regions. SAR data not only provides data when optical remote sensing data is not possible to acquire, but also provides information about geometric structure and moisture content of the vegetation, which is needed by agronomists and other end-users. SAR data can be enhanced by further in-situ observation data 150 provided by and to end-users (e.g., farmers 152).

The system in FIG. 5 can further provide information to regional authorities for the implementation of agro-environmental policies like water and fertilizer management, drive land use management, support farming activities, with particular focus on the development of sustainable management practices, and provide independent reliable information to the agri-business sector. The availability of information on crop conditions in space and time is an important issue to support the development of more productive and sustainable farming systems. This availability also contributes to increase competitiveness and to face environmental challenges, such as reduction of greenhouse gas emission and water consumption, soil contamination, and degradation. Thus, there is a recognized need to develop, validate, and apply methods that can operationally provide information regarding crops development or growth monitoring, height difference determination, crop field comparison, yield forecasting, and crop height estimation, early warning on nutritional and water stress and on biotic and abiotic risks. The development of these methods, requires the application of suitable SAR techniques able to provide cost effective and high quality spatialized information on the agro-ecosystems. Geo-spatial products and geo-information useful for crop monitoring and management can nowadays be efficiently produced via SAR and crop modelling systems for both regional and local applications.

Figure 6:
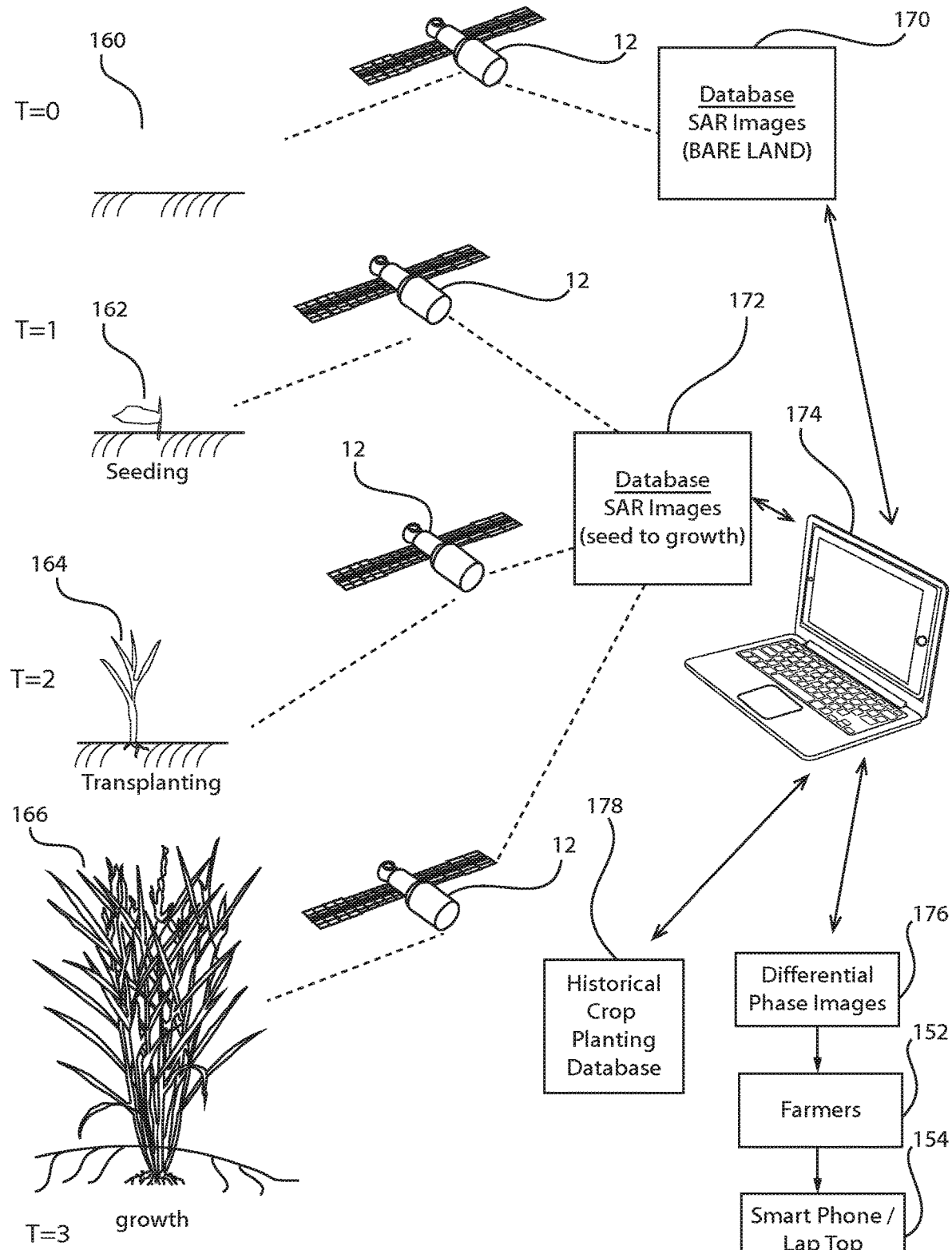
FIG. 6 is a block/flow diagram illustrating monitoring of crops via satellites generating SAR images and sending the SAR images for processing, in accordance with an embodiment of the present invention.

FIG. 6 is a block/flow diagram illustrating monitoring of crops via satellites generating SAR images and sending the SAR images for processing, in accordance with an embodiment of the present invention.

In various exemplary embodiments, at time T=0, there may be only a bare land image 160. At time T=1, there may be a seed image 162. At time T=2 there may be a small plant image 164. At time T=3 there may be a fully grown plant image 166. The images 160, 162, 164, 166 can be generated by the satellite 12 having SAR capabilities and transmitted to, e.g., a first database 170 and/or a second database 172. The first database 170 can, in one example, collect images of bare land. The second database 172 can collect images from the seeding phase to the fully grown phase. One skilled in the art can contemplate a plurality of different databases for storing and classifying such images. The images in the databases 170, 172 can be processed by a computing device 174. The computing device 174 can communicate with, e.g., a historical crop planting database 178 to compare the generated images to pre-stored images. The computing device 174 can also generate differential phase images 176. These images can be used to compare a crop or a field of crops from a starting point (e.g., planting) to an ending point (e.g., fully grown plant). All this data can be transmitted to a smartphone or laptop 154 or any other computing device handled or owned or operated by an end-user 152 (e.g., a farmer or land owner).

The SAR images can also be supplemented with at least topography data, optical images, surveys, and farmer assessments to verify and improve estimations of the height of the crops. For example, the SAR images can be used to determine a type of crop and a land plot boundary can be created that a farmer reviews, evaluates, confirms or verifies through the use of an electronic device (e.g., mobile device) in order to further improve the estimates of the heights of crops.

Moreover, all the SAR data for a certain crop sharing a same growth rate, height or texture can be collected or aggregated so that the system can estimate all planted lands that are growing a certain type of crop. Also, from the crop growth rate, the system can estimate how well an area or plot of land is performing compared with another geographical region and the system can correlate plant growth rates with an amount of precipitation that falls within that area or plot of land, average temperatures and dew points, how many extreme events (low temperature, high temperature, frost, etc.) occurred, and how they correlate with growth rate.

Therefore, growth rates of a crop or of a field of crops or of multiple fields of crops can be monitored, SAR images generated by satellites 12, SAR image data stored in databases 170, 172, SAR image data processed by computing devices 174, and SAR image data received by end-users 152 via their electronic devices 154.

Figure 7:
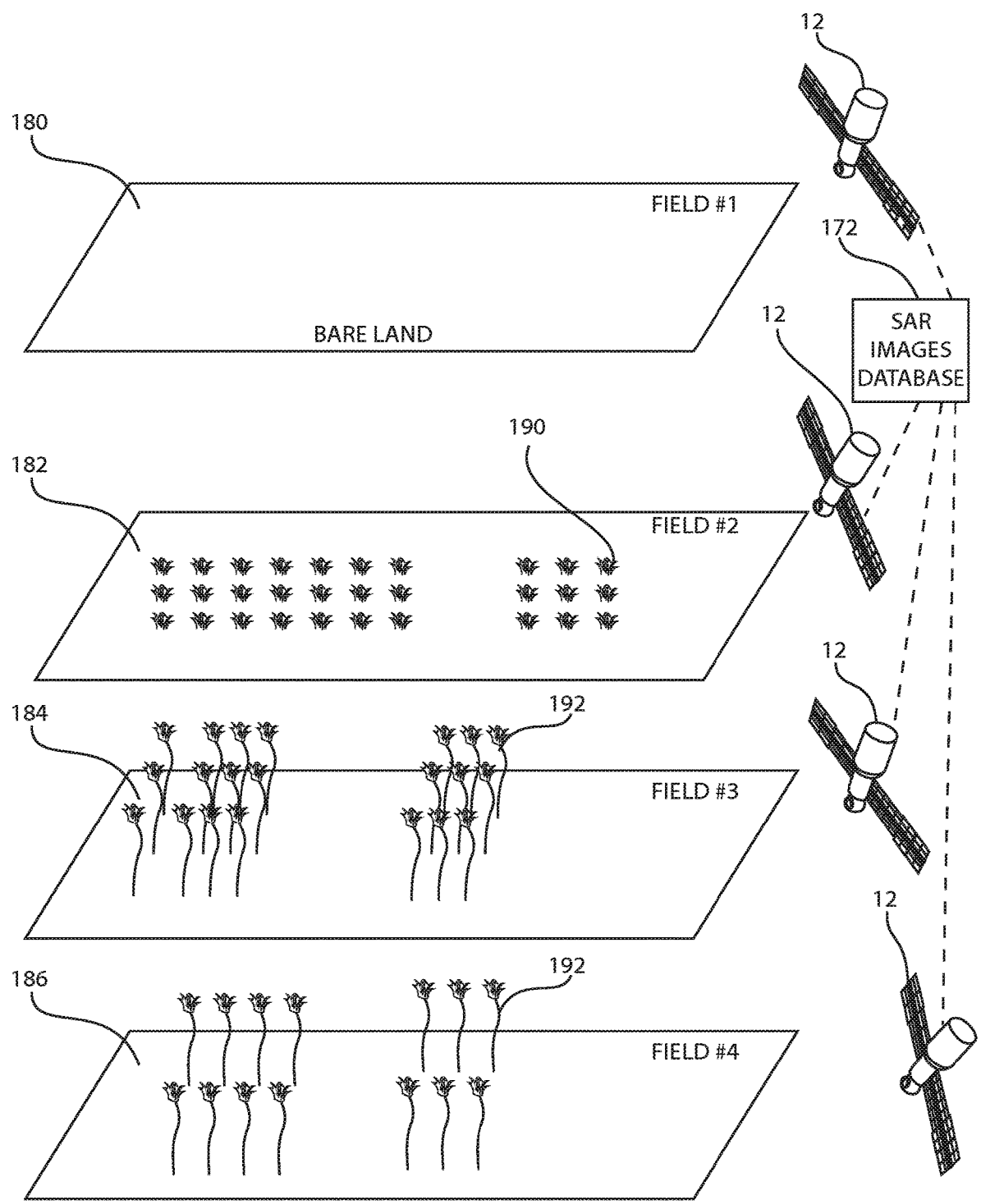
FIG. 7 is a block/flow diagram illustrating monitoring of different crops from different fields via satellites generating SAR images for processing, in accordance with an embodiment of the present invention.

FIG. 7 is a block/flow diagram illustrating monitoring different crops from different fields via satellites generating SAR images for processing, in accordance with an embodiment of the present invention.

In various exemplary embodiments, a first field 180 is shown where there is bare land, a second field 182 is shown where a first plant 190 has grown (e.g., soybean), a third field 184 is shown where a second plant 192 has grown (e.g., corn), and a fourth field 186 is shown where the second plant 192 has grown (e.g., corn). Satellites 12 can collect SAR data from each of the fields 180, 182, 184, 186. The SAR data can be transmitted from the satellites 12 to one or more databases 172 for further processing.

The change in height of a crop can be detected in each field 180, 182, 184, 186. In the bare field 180, there is no change in height. In fact, there is no plant whatsoever detected. In case no change is detected, the lack of signal is associated with either: 1) no seed was put into the ground or 2) seed was planted but never emerged. If no change is detected during, e.g., a 2 month period, that area is classified as bare land 180.

In the second field 182, soybean crops are detected, whereas in the second and third fields 184, 186 corn crops are detected. Higher growth rates are associated with corn, and lower growth rates can be associated with soybean. Also, similarities and differences between the third and fourth fields 184, 186 for the same crop (e.g., corn) can be calculated or determined. For example, the crops in fields 184 and 186 may have growth to a similar height because they were exposed to the same conditions, even though the fields 184 and 186 may have been in different counties or different states. In the alternative, the crops in fields 184 and 186 may have growth to a totally different height for the same crop, even though the fields were in the same county and within a distance of 10 miles from each other. The crop models 116 can determine that some other factor was accountable for such distinct variation. This data can be provided to farmers 152 to make adjustments to next year's harvest.

The growth rate can be confirmed from the crop models 116 (FIG. 4), which takes into account the soil, weather, and crop type, and determines the growth rate for that particular region. If the growth rate is confirmed by the SAR extracted from the crop height growth rate, then that particular area is classified to a particular crop. The crop model 116 can create a table with growth rates for a particular crop based on planting date and environmental information. These crop models 116 can be improved by integration of the vegetation index extracted from the images generated by the satellite 12 having SAR capabilities.

The growth rate (change in height) can be used as one parameter or variable for a decision tree classifier where the change in rate indicates specific crops. Further, the signal strength and the specific speckle noise can be used to improve the classification. The historical crop planting data is employed where the speckle noise is quantified across farms where well known crops have been planted. One way to quantify the speckle noise is to delineate each farm/field and then use the SAR signal from that farm/field and calculate the semivariogram of the noise. Each crop will have a specific variation associated with the planting pattern, distance between rows, and the canopy structure. These variabilities are expected to be similar from farm to farm or field to field (e.g., in the third and fourth fields 184, 186). Similarly the cross correlation between signals from the same farm/field acquired at two different moments of time can be used to calculate local disorder as an indicator of crop development.

Figure 8:
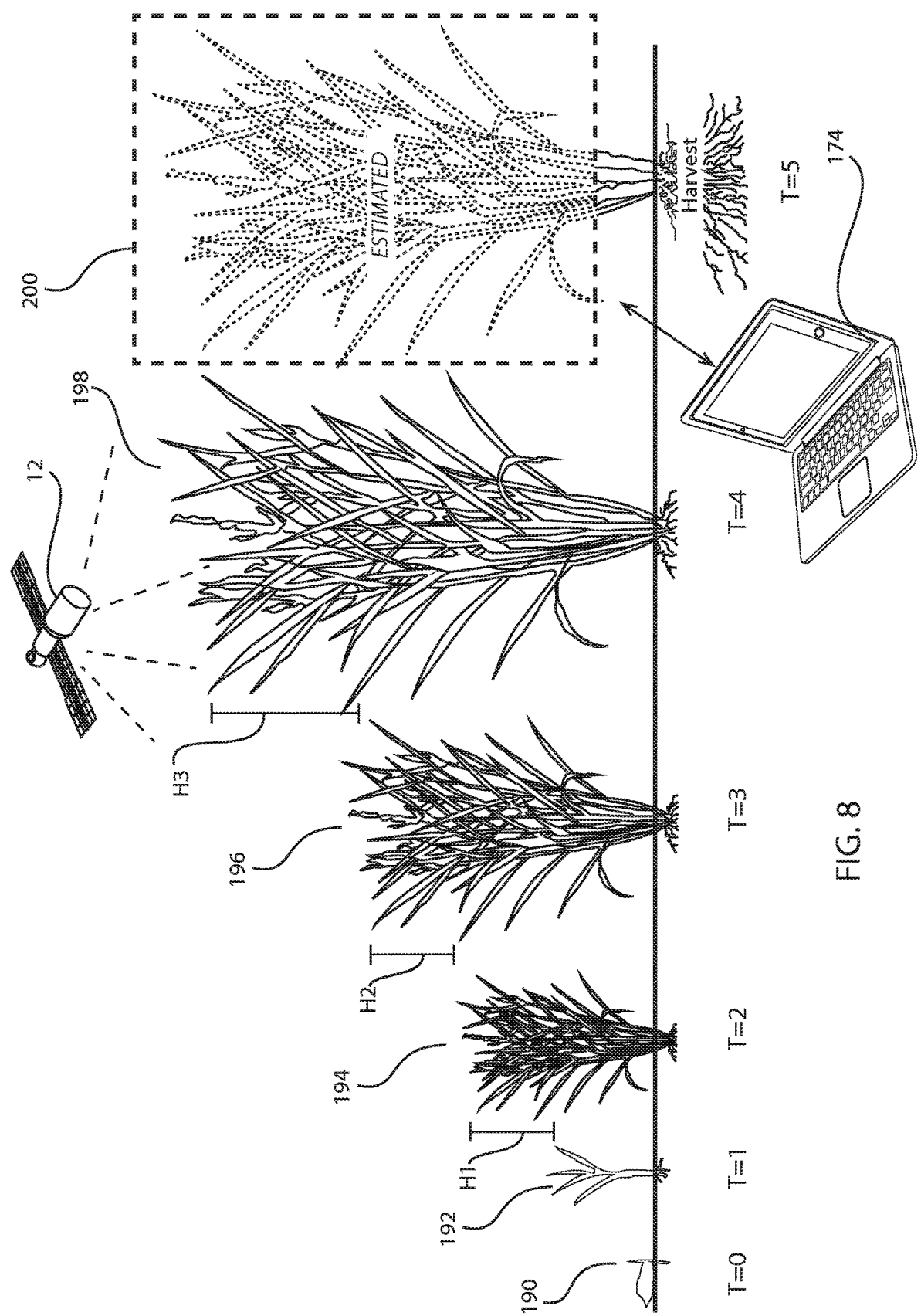
FIG. 8 is a block/flow diagram illustrating estimation of rate of growth for different crops in different fields, in accordance with an embodiment of the present invention.

FIG. 8 is a block/flow diagram illustrating estimation of rate of growth for different crops in different fields, in accordance with an embodiment of the present invention.

In various exemplary embodiments, the crop models 116 can be used to estimate a crop height at the end of the season (or at harvest time). For instance, at time T=0, a seed 190 is detected. T=0 can correlate to the time of planting or seeding. At time T=1, a plant 192 might have grown to a first height. This can be, e.g., after a week. At time T=2, the plant 194 grew a bit bigger to a second height. This can be, e.g., after 3 weeks. The difference in heights between time periods T=1 and T=2 can be designated as H1. At T=3, the plant 196 has grown even further to a third height. This can be, e.g., after 6 weeks. The difference in heights between time periods T=3 and T=2 can be designated as H2. At T=4, the plant 198 has grown even further to a fourth height. This can be, e.g., after 8 weeks. The difference in heights between time periods T=4 and T=3 can be designated as H3. The crop models 116 can be used to estimate the crop growth at time T=5, which can be the harvest time. The estimated plant 200 is shown at T=5. The plant 200 can be estimated based on a number of factors or parameters or variables discussed above. The continuously collected data can be provided to a computing device 174 for further processing and for executing the crop models 116 (FIG. 4). Thus, the growth rate for a crop during a growing season can be calculated based on the generated SAR images received from satellites 12 and crop development during the growing season can be calculated.

Therefore, according to the present invention, the crop type can be determined, the SAR images can be distinguished and classified, and a vegetation signal between different crops using optical imaging and SAR capable satellites can be determined. Moreover, bare land can be determined based on signal strength and a growth rate can be calculated for each crop based on signal growth during the growing season. Similarities and differences between farms or lands or fields having the same crop planted can also be determined. The total area (within a county or state or any region) that has similar crops planted (e.g., corn) can further be detected, as well as the crop development during the growing season and the soil moisture based on background signal level. The SAR data can also be used to assess potential damages to the crops and relay that information to the end-users (e.g., farmers and/or landowners).

In summary, for farmers and land managers, increasing crop yields and cutting costs while reducing environmental pollution is a constant challenge. To accomplish this goal, many farm managers are looking for new technologies to help them decide when and where to irrigate, fertilize, seed crops, and use herbicides. Currently the decisions are based on very limited data collected in "spot checks" from the ground. However, recent technological advances in geographic information systems (GIS) and computer modeling are playing a part in farm management and precision farming. Using SAR data collected by satellites, important agricultural factors like plant health, plant cover and soil moisture can be monitored from space, providing a much bigger picture of the land surface that can be combined with other technologies to help cut costs, increase crop yields, estimate heights of crops, and compare heights of crops across different fields in different areas or regions of a county or state or from country to country.

Indeed, SAR is the premier sensor for the detection of crop growth changes and crop height changes because it is sensitive to small surface changes on the order of the radar wavelength ($1m$ down to several millimeters). SAR is also independent of solar illumination and is generally unaffected by cloud cover. In addition, SAR has the advantage of providing control over such factors as power, frequency, phase, polarization, incident angle, spatial resolution, and swath width, all of which are important when designing and operating a system for the extraction of quantitative information.

The descriptions of the various embodiments of the present invention have been presented for purposes of illustration, but are not intended to be exhaustive or limited to the embodiments described. Many modifications and variations will be apparent to those of ordinary skills in the art without departing from the scope and spirit of the described embodiments. The terminology used herein was chosen to best explain the one or more embodiments, the practical application or technical improvement over technologies found in the marketplace, or to enable others of ordinary skills in the art to understand the embodiments described herein.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to at least one processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks or modules.

The computer readable program instructions can also be loaded onto a computer, other programmable data processing apparatus, or other device to cause a series of operational blocks/steps to be performed on the computer, other programmable apparatus or other device to produce a computer implemented process, such that the instructions which execute on the computer, other programmable apparatus, or other device implement the functions/acts specified in the flowchart and/or block diagram block or blocks or modules.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method for assessing crop development by using synthetic aperture radar (SAR) images (which are intended to be illustrative and not limiting), it is noted that modifications and variations can be made by persons skilled in the art in light of the above teachings. It is therefore to be understood that changes may be made in the particular embodiments described which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A method for assessing crop development by using a synthetic aperture radar (SAR), the method comprising:
generating SAR images from scanning fields including crops;
monitoring growth of the crops within the fields during a predetermined time period;
estimating an average height of the crops during the predetermined time period by using interferometric information from one or more of the SAR images; and
identifying crop type and collecting all SAR data related to the identified crop type sharing a same growth rate, height, and texture to estimate all planted lands growing the identified crop type.

2. The method of claim 1, further comprising monitoring reflected radar signals from the crops received by one or more satellites.

3. The method of claim 2, further comprising extracting at least soil composition data, soil moisture data, and vegetation density data.

4. The method of claim 1, further comprising supplementing the SAR images with at least topography data, optical images, surveys, and farmer assessments to verify and improve estimations of the height of the crops.

5. The method of claim 1, further comprising differentiating between crops in different fields by monitoring changes in the height of the crops.

6. The method of claim 1, further comprising determining bare land images and creating a bare land topology database for estimating the height of the crops.

7. The method of claim 1, further comprising determining average crop height differences between crops in different fields.

8. The method of claim 1, further comprising comparing crop fields in different regions growing a same crop to determine similarities and differences therebetween and to further compare growth performance therebetween by analyzing at least average temperature, dew point, and occurrence of extreme events.

9. The method of claim 1, further comprising determining a total area having a same crop planted.

10. The method of claim 1, further comprising assessing potential damage to the crops and relaying such information to one or more end-users.

11. A system for assessing crop development by using a synthetic aperture radar (SAR), the system comprising:
one or more moving aerial objects for generating SAR images from scanning fields including crops;
a SAR processing system for monitoring growth of the crops within the fields during a predetermined time period; and
crop growth models for estimating an average height of the crops during the predetermined time period,
wherein crop type is identified and SAR data related to the identified crop type sharing a same growth rate, height, and texture are collected to estimate all planted lands growing the identified crop type.

12. The system of claim 11, wherein reflected radar signals from the crops received by the one or more moving aerial objects are monitored.

13. The system of claim 12, wherein at least soil composition data, soil moisture data, and vegetation density data are extracted.

14. The system of claim 11, wherein the SAR images are supplemented with at least topography data, optical images, surveys, and farmer assessments to verify and improve estimations of the height of the crops.

15. The system of claim 11, wherein crops in different fields are differentiated by monitoring changes in the height of the crops.

16. The system of claim 11, wherein bare land images are determined and a bare land topology database is created for estimating the height of the crops.

17. The system of claim 11, wherein average crop height differences between crops in different fields are determined.

18. The system of claim 11, wherein crop fields in different regions growing a same crop are compared to determine similarities and differences therebetween and growth performance therebetween is compared by analyzing at least average temperature, dew point, and occurrence of extreme events.

19. The system of claim 11, wherein a total area having a same crop planted is determined.

20. A system for assessing crop development by employing a synthetic aperture radar (SAR), the system comprising:
one or more moving aerial objects for generating SAR images from scanning fields including structures where a location and a height of the structures is well-established, wherein a signal reflected from the well-established structures and a signal reflected from crops provide for a change that quantifies a height of the crops; and
a SAR processing system for measuring an absolute height of the crops at a moment the SAR images are acquired.

* * * * *